US012100206B2

(12) United States Patent
Perrucci et al.

(10) Patent No.: US 12,100,206 B2
(45) Date of Patent: Sep. 24, 2024

(54) REAL-TIME RISK TRACKING

(71) Applicant: NCR Voyix Corporation, Atlanta, GA (US)

(72) Inventors: Levino Felix Perrucci, Mableton, GA (US); Christopher John Costello, Suwanee, GA (US); Gregory Joseph Hartl, Atlanta, GA (US); Caleb Wayne Martinez, Fayetteville, GA (US); Jodessiah Sumpter, Alpharetta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 400 days.

(21) Appl. No.: 17/511,836

(22) Filed: Oct. 27, 2021

(65) Prior Publication Data
US 2023/0130735 A1   Apr. 27, 2023

(51) Int. Cl.
*G06V 20/20* (2022.01)
*G06V 20/40* (2022.01)
*G06V 20/52* (2022.01)

(52) U.S. Cl.
CPC .............. *G06V 20/20* (2022.01); *G06V 20/40* (2022.01); *G06V 20/53* (2022.01); *G06V 20/44* (2022.01)

(58) Field of Classification Search
CPC ........ G06V 20/20; G06V 20/40; G06V 20/53; G06V 20/44
See application file for complete search history.

(56) References Cited

U.S. PATENT DOCUMENTS

| | | | |
|---|---|---|---|
| 2006/0261157 A1* | 11/2006 | Ostrowski | G07G 1/0054 235/383 |
| 2017/0185984 A1* | 6/2017 | Leggo | G06Q 20/204 |
| 2017/0193309 A1* | 7/2017 | Kanda | G06T 7/215 |
| 2019/0043003 A1* | 2/2019 | Fisher | G06N 3/04 |

\* cited by examiner

*Primary Examiner* — Syed Haider
(74) *Attorney, Agent, or Firm* — Schwegman Lundberg & Woessner, P.A.

(57) ABSTRACT

A mapping of a physical environment and objects within the physical environment are generated. The objects are tracked within the physical environment and any transaction data associated with transaction correlated with the objects. The objects, relationships between each object, and any transaction data are evaluated to assign a risk score or an assessment needs score. Each score is mapped to one or more unique visual features and a heat map is generated that depicts the objects within the physical environment along with their visual features. The heat map is continuously updated in real time as scores change for the objects and the visual features change. The heat map is rendered within an interface of a device operated or worn by an attendant to assist the attendant in quickly ascertaining any risk of loss, any risk of threat, and/or any customer in need of assistance within the physical environment.

7 Claims, 3 Drawing Sheets

REAL-TIME RISK TRACKING

BACKGROUND

Self-Service (SS) transactions via Self-Service Terminals (SSTs) or Self-Checkouts (SCOs) are increasingly being deployed with greater frequency in retail stores. One reason for this deployment bonanza is because customers are becoming more accustomed to SS transactions via SCOs, but another reason is because retail stores are significantly under staffed and the pandemic exacerbated this issue for retailers.

With SS transactions, the retailer utilizes a management terminal operated by an attendant to monitor the SS transactions for purposes of customer assistance and fraud detection. Fraud remains a significant concern for the retailers during SS transactions.

Typically, a single attendant is responsible for monitoring multiple SCOs. At any given moment in time an attendant can be responsible for monitoring several concurrent transactions from the management terminal, visually inspecting the SCO areas where the the customers are checking out, and potentially and simultaneously responding to a customer that has a question of the attendant. In this chaotic environment, the attendant needs to know where to optimally place their focus in order to ensure that any customer in need of assistance is not waiting too long for assistance and in order to ensure that the retailer does not experience any loss through customer theft.

A customer that waits too long may provide negative social media reviews for the retailer and may not return to the retail store with future business. Moreover, lines form behind the customer waiting on assistance for access to the customer's SST, such that the displeasure of one customer can quickly become retailer dissatisfaction of many customers who are also waiting to checkout of the store.

Unfortunately, attendants are human and a prone to making decisions that are less than optimal largely because the attendants lack the ability to quickly evaluate all the available information for all the concurrent checkouts and and to calculate in real-time risks associated with a chaotic checkout environment in order to focus their attentions on the most pressing situations.

SUMMARY

In various embodiments, a system and methods for real-time risk tracking are provided.

According to an embodiment, a method for real-time risk tracking is presented. Objects present in a physical environment are mapped to a data structure and movements of the objects are tracked within the physical environment. Relationships between the each of the objects are updated based on the tracking of the objects. Characteristics are assigned to each object based on the object tracking and the updating of the relationships. Each object is scored based on the object's tracking, relationships, and characteristics. The data structure is updated with the corresponding scores of each object. The data structure is rendered within an interface on a device operated by or worn by an attendant who is monitoring the objects within the physical environment.

DETAILED DESCRIPTION

Figure 1:
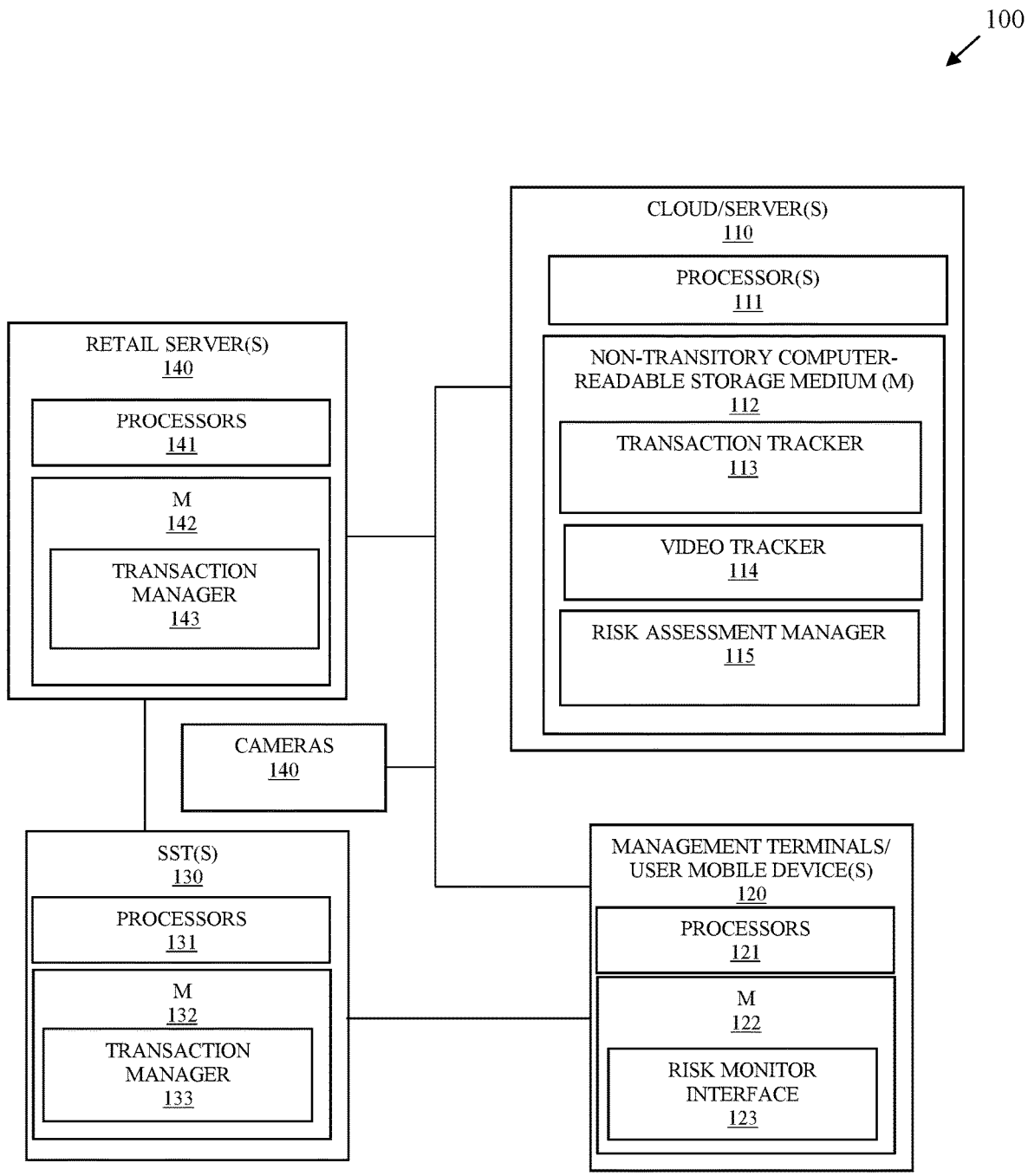
FIG. 1 is a diagram of a system for real-time risk tracking, according to an example embodiment.

FIG. 1 is a diagram of a system/platform 100 for real-time risk tracking, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of real-time risk tracking, presented herein and below.

System/platform 100 (herein after just "system 100") provides a processing environment by which customers are monitored within a physical environment for risks, threats, and assistance needs. The real-time physical environment is modeled as a heat map where customers and devices (such as SSTs or Point-Of-Sale (POS) terminals) are represented within an interface with different variations of color and/or visual effects for an attendant to quick discern from a rendered interface the degrees of risks, threats, or assistance needs associated with each of the devices and each of the customers at any given moment in time. A variety of information can be collected in real time and analyzed such as video feeds and transaction information being reported by the terminals during transactions. Rules with respect to how the information is scored for risks, threats, and/or assistance needs are processed to calculate real-time scores; each score corresponding to a specific level or degree of risk, threat, and/or assistance need. Each level or degree maps to a specific variation of color and/or a specific type of visual effect.

An attendant operating a management terminal, or a user mobile device is provided the interface in real time on a display of the terminal/mobile device for purposes of quickly accessing the risks, threats, and assistance needs of customers within the physical environment of the attendant.

In some embodiments, the user mobile device is a pair of glasses, googles, of single lens worn over one of the attendant's eyes that permits the attendant to see the physical environment with the interface rendered to a side of the attendant's vision within the glasses.

In some embodiments, the rendered interface is overlayed onto the attendant's field of vision creating an augmented reality where objects (devices and customers) physically present within the physical environment are overlaid with their calculated level or degree-based visual colors and/or visual effects.

As used herein, the terms "customer" and/or "consumer," may be used interchangeably and synonymously herein and below. This refers to an individual who is engaged in SS transaction at an SST or is physically present within a store's physical environment.

As used herein, the terms "attendant" and/or a "clerk" may be used interchangeably and synonymously herein and below. This refers to an individual who is operating a management terminal or a mobile management device as oversight of the SS transactions being processed at the SSTs.

This may also refer to any employee or agent of a retail store that is tasks with monitoring the physical environment of a given retail store.

System 100 comprises a cloud/server 110, one or more management terminals/mobile devices 120, a plurality of SSTs 130, one or more retail servers 140, and one or more overhead cameras 140 situated above the SSTs 130 and capturing video of the SST transaction areas during the SS transactions.

Cloud/Server 110 comprises at least one processor 111 and a non-transitory computer-readable storage medium 112. Medium 112 comprises executable instructions for a transaction tracker 113, video tracker 114, and risk assessment manager 115. The executable instructions when provided to and executed by processor 111 from medium 112 cause processor 111 to perform the processing discussed herein and below for transaction tracker 113, video tracker 114, and risk assessment manager 115.

Each management terminal/mobile device 120 (hereinafter just "management terminal 120") comprises at least one processor 121 and a non-transitory computer-readable storage medium 122. Medium 122 comprises executable instructions for risk monitor interface 123. The executable instructions when provided to and executed by processor 121 from medium 122 cause processor 121 to perform the processing discussed herein and below for risk monitor interface 123.

Each SST 130 comprises at least one processor 131 and a non-transitory computer-readable storage medium 132. Medium 132 comprises executable instructions for a transaction manager 133. The executable instructions when provided to and executed by processor 131 from medium 132 cause processor 131 to perform the processing discussed herein and below for transaction manager 133.

Each retail server 140 comprises at least one processor 141 and a non-transitory computer-readable storage medium 142. Medium 142 comprises executable instructions for a transaction manager 143. The executable instructions when provided to and executed by processor 141 from medium 142 cause processor 141 to perform the processing discussed herein and below for transaction manager 143.

Cameras 140 are dispersed through a retail store located in a variety of locations. Some of the cameras 140 can be three-dimensional (3D) cameras, Lidar-capable cameras, or two-dimensional (2D) stereo vision cameras. Some cameras 140 may be integrated peripheral devices of the SSTs 130 or cameras associated with integrated item barcode scanners of the SSTs 130. Each camera comprises an identifier that is mapped to a specific physical location within the store and mapped to a specific field of view or area that images at the specific location are associated with. Cameras 140 streams image frames of video into a network accessible storage location and/or in-memory storage buffer which is accessible to cloud/server 110 along with metadata associated with each image frame, such as time and date stamp, camera identifier, field-of-view or area identifiers, etc.

Initially, risk assessment manager 115 is configured with a set of retailer-provided rules. These rules custom device conditions associated with risks, threats, or customer assistance needs. Each rule comprises a processable statement with one or more object identifiers, behavior identifiers (e.g., for observed behaviors of a customer from the video feeds etc.) specific transaction details (e.g., greater than 20 items, an item processed over $100, a non-scanned item, weight mismatch, etc.), Boolean conditions, and one or more actions to perform when the statement evaluates to true and/or false. Each object identifier represents a unique object identifier and an object type. Object types comprise people types, bag types, cart types, device types, and/or item types. The device types comprise a terminal type (SST 130, POS terminal 130, management terminal 120, and/or user mobile device 120), digital sign type, standalone scanner type, and/or an integrated peripheral type for a terminal 130 (such as a scanner, a media dispenser, a media accepter, a weigh scale, a bagging scale, a touch display, a printer, a card reader, etc.). The behavior identifiers represent tracked behaviors of the customer observable from the video feeds, such as and by way of example only, a given customer lingering in and out of a same aisle for more than a configured amount of time, a given customer returning to a same aisle more than a configured amount of time, a customer displaying facial features associated with anger or frustration, a customer displaying frustration by throwing hands in the air or slamming items down, a customer observed placing an item in their clothing or in a personal bag, a customer observed with a weapon, etc. The actions comprises a unique action identifier for performing a processing task, such as identifiers for actions that update a current risk score, assign visual color attributes to an object, assign visual effect attributes to an object, capture a video clip, dispatch a staff member, raise an alert to a security system, play an audible sound, etc.

Transaction tracker 113 obtains real-time transaction details for transactions being processed on SSTs 130 and/or being processed by transaction manager 143. Transaction details comprise, by way of example only, a unique transaction identifier, transaction start time and date, terminal identifier for SST 130, item identifiers for items scanned, item price, item weight, item quantity, item description, item discounts applied, any available customer identifier for a customer of the given transaction, any loyalty level for an available customer, total number of transaction items when payment is selected for a given transaction, total transaction price when the payment is selected for the given transaction, payment method provided by the customer for payment of the given transaction, etc.

Transaction tracker 113 provides the transaction details for each transaction to risk assessment manager 115.

Video tracker 114 uses bounding boxes in image frames from the video feeds to track the objects and current locations of each object using the object identifiers. This can be done in a variety of manners, such as through cropped bounding boxes for each type of object (person, item, device) and by eliminating pixels known to be associated with background structures (shelves, floor, ceiling) at each location of the object based on the camera identifiers and the known locations and field of views of the corresponding cameras 140. Furthermore, video tracker 114 analyzes cropped images of people to identify and assign behaviors to the people at their current locations (this can be through facial features or extremities of the people).

Video tracker 114 provides the object identifiers with corresponding object types, current locations of each object within the physical environment, and behavior identifiers for each tracked object to risk assessment manager 115.

Risk assessment manager 115 creates a tracked session for each customer present within the store and/or for each transaction using the object identifiers, behavior identifiers, and transaction identifiers of the transaction details. Based on the location within the physical environment, risk assessment manager 115 can assign individuals to specific transactions and assign specific items as being held or in the possession of a given customer (item is in a bag, item is in a cart, or item is being held by the customer).

Risk assessment manager 115 processes the customized rules with the identifiers against the conditions and processes the actions when the rules evaluate to true and/or false. The processed actions are continuously, and in real time, determining a current risk or assessment need for each transaction and each customer within the store by providing as output of some of the actions a level or degree of risk value or assessment need value. Each risk value or assessment need value is assigned a gradation of color along a color range and/or assigned a visual effect (strobing at different rates, blinking at different rates, bolded at different degrees of boldness, flashing at different rates, etc.).

Risk assessment manager 115 renders a mapping of the physical environment proximate to an attendant with the color attributes and/or visual effect attributes within risk monitor interface 123 on management terminal 120 or user mobile device 120 (phone, tablet, watch, glasses, laptop, etc.). As the attendant is viewing the physical environment, the risk values or assessment need values are continuously changing to permit the attendant to visually discern the risk and assessment needs of customers present within the attendant's physical environment. Moreover, the attendant can use the colors and/or visual effect attributes for each customer and terminal present within the physical environment of the attendant (viewable within interface 123) to quickly prioritize the most pressing issue that the attendant needs to address.

One now appreciates how system 100 is particularly beneficial to attendants that manage a group of SSTs 130 by continuously, dynamically, and in real-time providing a visual assessment of risks, threats, and assessment needs of customers within the physical environment of the attendant without the attendant having to rely of their judgment and without the attendant having to be completely focused on their surroundings, which is unrealistic in many circumstances. This optimally mitigates a retail store's risk of loss, risk of physical threats, and risk of disgruntles and dissatisfied customers.

A variety of operational scenarios is now discussed for further illustration and comprehension of the real-time risk tracking techniques presented herein.

In an embodiment, a 3D camera 140 or multiple 2D cameras provide video of a bullpen associated with a bank of SSTs 130 being managed by an attendant at a management terminal 120. A 3D mapping of the bullpen is generated, when a customer enters with a cart that is full (greater than a predefined number of items), the heat map rendered within interface 123 to the attendant is colored red over the cart's location within the bullpen. As the customer scans items reported in the transaction details by transaction tracker 113 from the cart, risk assessment manager 115 changes the visual attributes associated with the cart showing the red color gradually transitioning to green (red associated with high risk and green low risk) until the cart is detected as being empty based on the cart identifier and item identifiers and their corresponding locations reported by video tracker 114 to assessment manager 115.

In an embodiment, when a customer enters the bullpen area of a bank of SSTs with a high value item (price above a threshold set in one of the rules, such as $100), risk assessment manager 115 in processing the rules changes a color attribute for the item within a heat map rendered of the bullpen to red, such that the item appears in the interface 123 with a red color in a tracked location for the high value item within the bullpen. The attendant can quickly ascertain which customer within the bullpen has the item from interface 123. When transaction tracker 113 reports transaction details indicating that the item code associated with the item was scanned for the customer's transaction, risk assessment manager 115 changes the color of the item to green within interface 123. The attendant knows to pay attention to the customer and the item when colored red but once colored green, the attendant can refocus their attention elsewhere in the bullpen for any other customers, terminals, or items colored red.

In an embodiment, when a customer is scanning items at an SST 130, stops scanning their items and turns around. This is reported by video tracker 114 as unique behavior identifier to assessment manager 115 who is already aware of the transaction at terminal 130 based on the heat map rendered in interface 123. This behavior identifier causes a color attribute assigned to the customer to change to yellow within the heat map as an indication to the attendant that the customer is in need of help, when the customer is addressed by the attendant or someone else, they turn back around and continue to scan their remaining items causing the color attribute for the customer to change back to green. If the customer is not addressed within a period of time defined in the rules after being colored yellow and the customer does not turn around to finish scanning within that period of time, the color of the customer within the heat map gradually changes from yellow to red as an indication to the attendant that the customer needs to be addressed by the attendant and have been waiting too long for attendant assistance.

In an embodiment, system 100 can be used to track customers throughout the store, such as a customer wandering within the store, a customer placing items in their clothing or a personal bag, or a customer that appears to take out a weapon. The rules as evaluated by assessment manager 115 can be processed to identify the customer's current location within the store and color the customer within the heat map for that area of the store red indicating that assistance is needed or that the customer may be stealing items. In the case of a weapon, the security system can be sent an alert and staff notified for in-store procedures to be initiated to mitigate the threat, the authorities may automatically be dispatched to the store.

In an embodiment, the heat map itself of the bullpen and/or for each area of the store (preconfigured areas associated with a set distance, set aisle, and/or set department) may be created and generated using an Augmented Reality environment mapper that determines depth and distances using an AR environment mapping algorithm by scanning anchor points of the area being mapped at predefined distances. In this embodiment, colors or visual effects of each object (items, carts, people, terminals, etc.) may be superimposed within the live video feed being viewed by an attendant onto or around an image of a customer/image/cart/terminal; for example, an outline of an item within a cart, is colored red or blinks. Here, AR is used to provide the heat map and risk values of assessment need values. That is, the live video feed associated with the objects are augmented or modified to provide the colors and/or visual effects in real time to the attendant.

In an embodiment, the video tracker 114 and rules processed by assessment manager 115 may be performed by one or more trained machine-learning algorithms/models. For example, object identifiers, object tracking, and object relationships based on physical calculated distances between two or more objects can be provided as output from a machine-learning model when provided the live video feeds as input. The risk values or assessment need values may similarly be provided as output from a trained machine-learning model that is provided the transaction details, the object identifiers, and object relationships as input.

In an embodiment, the video data and transaction data may further be sent to a central monitoring location for asset protection and/or management, which can be external to the store or the retailer. The video and transaction data may be retained for auditing and/or further analyzing, studying, monitoring, and detecting of improvements in recognizing risk or assessment need situations within the store.

In an embodiment, the transaction data and the video data may be analyzed by risk assessment manager 115 for purposes of evaluating and measuring performance response and actions of the attendant during high risk or medium risk situations requiring intervention of the attendant. In such situations, any attendant overrides on terminal 130 and/or on terminal 120 (management terminal embodiment) may be captured and correlated with the video data and the transaction data for purposes of gathering metrics on the response times and overall performance of the attendant. Metrics may also be gathered to measure the performance of system 100 as a whole.

Figure 2:
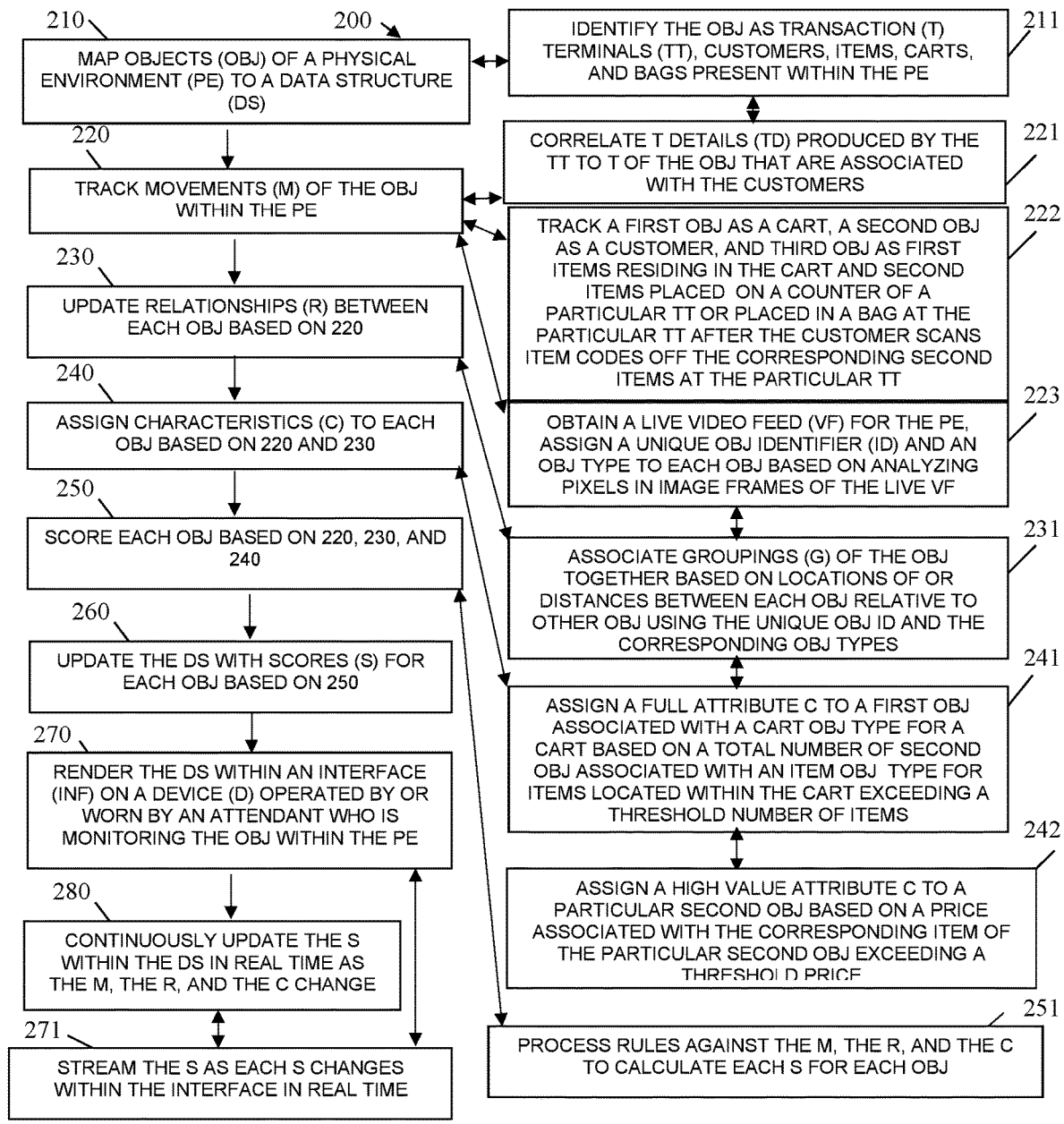
FIG. 2 is a diagram of a method for real-time risk tracking, according to an example embodiment.
Figure 3:
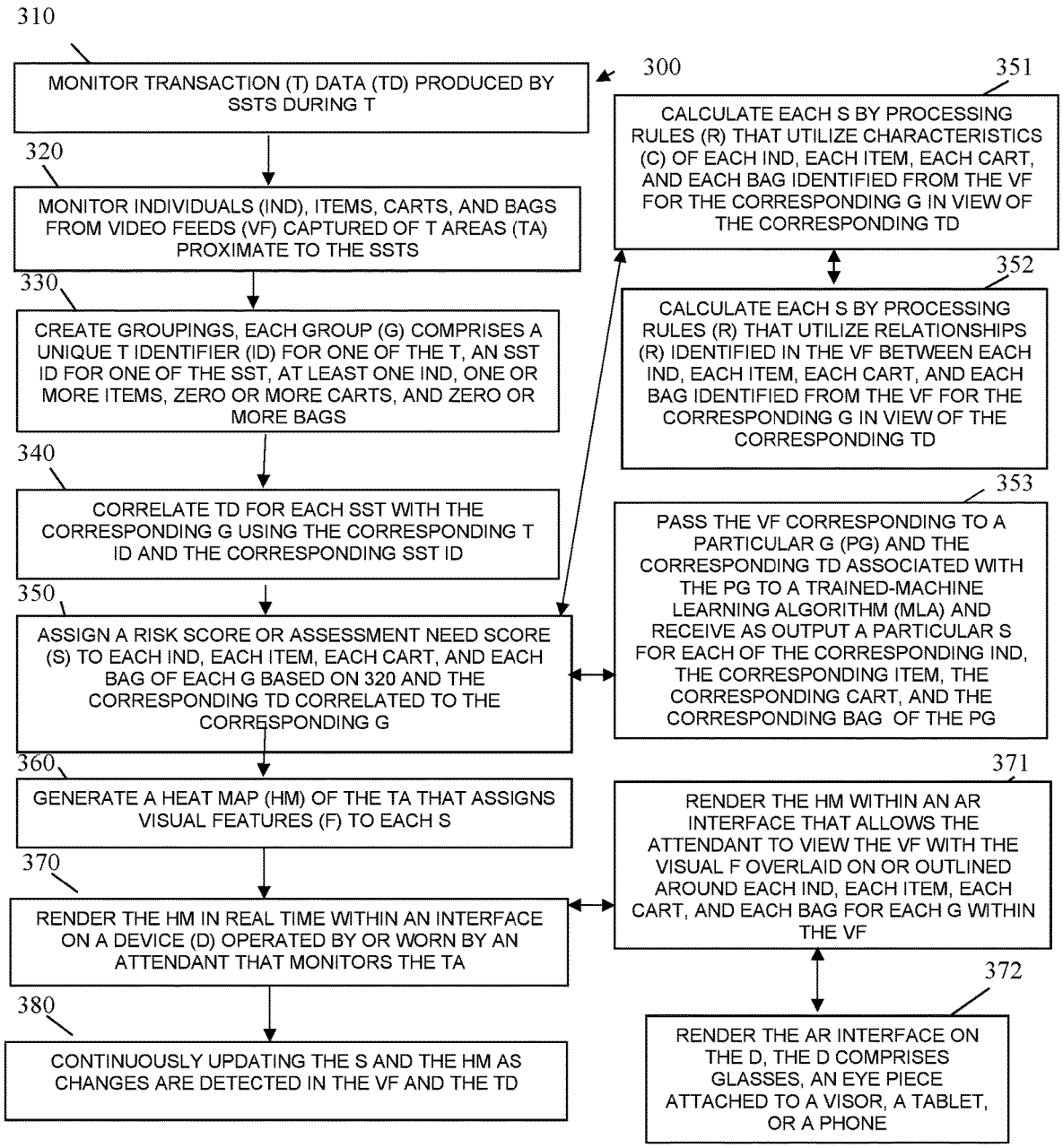
FIG. 3 is a diagram of another method for real-time risk tracking, according to an example embodiment.

The above-referenced embodiments and other embodiments are now discussed within FIGS. 2-3.

FIG. 2 is a diagram of a method 200 for real-time risk tracking, according to an example embodiment. The software module(s) that implements the method 200 is referred to as a "risk tracker." The risk tracker is implemented as executable instructions programmed and residing within memory and/or a non-transitory computer-readable (processor-readable) storage medium and executed by one or more processors of one or more devices. The processor(s) of the device that executes the risk tracker are specifically configured and programmed to process the risk tracker. The risk tracker may have access to one or more network connections during its processing. The network connections can be wired, wireless, or a combination of wired and wireless.

In an embodiment, the device that executes the risk tracker is cloud 110. Cloud 110 comprises a plurality of servers logically cooperating and accessible as a single server 110 (cloud 110).

In an embodiment, the device that executes the risk tracker is a server 110 that is separate from any given retail server 120.

In an embodiment, the device that executes the risk tracker is retail server 140.

In an embodiment, the risk tracker is all or some combination of 113, 114, and/or 115.

At 210, the risk tracker maps objects of a physical environment to a data structure.

In an embodiment, at 211, the risk tracker identifies the objects as transaction terminals 130, customers, items carts, and bags that are present within the physical environment.

At 220, the risk tracker tracks movements of the objects within the physical environment from a video feed.

In an embodiment of 211 and 220, at 221, the risk tracker correlates transaction details produced by the transaction terminals to transactions of objects that are associated with the customers. Each customer and that customer's transaction data are correlated together.

In an embodiment, at 222, the risk tracker tracks a first object as a cart, a second object as a customer, and third objects as first items residing in the cart and second items placed on a counter of a particular transaction terminal or placed in a bag at the particular transaction terminal after the customer scans item codes off the corresponding second items at the particular transaction terminal.

In an embodiment, at 223, the risk tracker obtains a live vide feed for the physical environment and assigns a unique object identifier and an object type to each object based on analyzing pixels in image frames of the live video feed.

At 230, the risk tracker updates relationships between each object based on the tracking.

In an embodiment of 223 and 230, at 231, the risk tracker associates groupings of the objects together based on locations or or distances between each object relative to other objects using the unique object identifiers and the corresponding object types.

At 240, the risk tracker assigns characteristics to each object based on 220 and 230.

In an embodiment of 231 and 240, at 241, the risk tracker assigns a full attribute characteristic to a first object associated with a cart object type for a cart based on a total number of second objects associated with an item object type for items located within the cart exceeding a threshold number of items.

In an embodiment of 241 and at 242, the risk tracker assigns a high value attribute characteristic to a particular second object based on a price associated with the corresponding item of the particular second object exceeding a threshold price.

At 250, the risk tracker scores each object based on 220, 230, and 240.

In an embodiment, at 251, the risk tracker processes customized rules against the movements, the relationships, and the characteristics to calculate each score for each object.

At 260, the risk tracker updates the data structure for each object with that object's corresponding score calculated at 250.

At 270, the risk tracker renders the data structure within an interface on a device operated by or worn by an attendant who is monitoring the objects within the physical environment.

In an embodiment, at 271, the risk tracker streams the score as each score changes within the interface in real time.

In an embodiment, at 280, the risk tracker continuously updates the score within the data structure in real time as the movements, the relationships, and the characteristics of the objects change.

In an embodiment,

FIG. 3 is a diagram of another method 300 for real-time risk tracking, according to an example embodiment. The software module(s) that implements the method 300 is referred to as a "transaction risk monitor." The transaction risk monitor is implemented as executable instructions programmed and residing within memory and/or a non-transitory computer-readable (processor-readable) storage medium and executed by one or more processors of a device. The processors that execute the transaction risk monitor are specifically configured and programmed for processing the transaction risk monitor. The transaction risk monitor may have access to one or more network connections during its processing. The network connections can be wired, wireless, or a combination of wired and wireless.

In an embodiment, the device that executes the transaction risk monitor is cloud 110. In an embodiment, the device that executes the transaction risk monitor is server 110.

In an embodiment, the device that executes the transaction risk monitor is retail server 140.

In an embodiment, the transaction risk monitor is all of or some combination of 113, 114, 115, and/or method 200 of FIG. 2.

The transaction risk monitor presents another and, in some ways, enhanced processing perspective from that which was discussed above for cloud 110 and method 200.

At 310, the transaction risk monitor monitors transaction data produced by SSTs 130 during transactions.

At 320, the transaction risk monitor monitors individuals, items, carts, and bags from video feeds captured of transaction areas proximate to the SSTs 130.

At 330, the transaction risk monitor creates groupings to track separately within the transaction areas, each group comprises a unique transaction identifier for one of the transactions, an SST identifier for one of the SSTs 130, at least one individual, one or more items, zero or more carts, and zero or more bags.

At 340, the transaction risk monitor correlates the transaction data for each SST 130 with the corresponding group using the corresponding transaction identifier and the corresponding SST identifier.

At 350, the transaction risk monitor assigns a risk score or an assessment need score (herein after just "score") to each individual, each item, each cart, and each bag of each group based on 320 and the corresponding transaction data correlated to the corresponding group at 340.

In an embodiment, at 351, the transaction risk monitor calculates each score by processing rules that utilize characteristics of each individual, each item, each cart, and each bag identified from the video feeds for the corresponding group in view of the corresponding transaction data.

In an embodiment of 351 and at 352, the transaction risk monitor calculates each score by processing rules that further utilize relationships identified in the video feeds between each individual, each item, each cart, and each bag identified from the video feeds for the corresponding group in view of the corresponding transaction data.

In an embodiment, at 353, the transaction risk monitor passes the video feed corresponding to a particular group and the corresponding transaction data associated with the particular group to a trained machine-learning algorithm. The trained machine-learning algorithm provides as output a particular score for each of the corresponding individual, the corresponding item, the corresponding cart, and the corresponding bag of the particular group.

At 360, the transaction risk monitor generates a heat map of the transaction areas that assigns visual features to each of the scores.

At 370, the transaction risk monitor renders the heat map in real time within an interface 123 on a device 120 operated by or worn by an attendant that monitors the transaction areas.

In an embodiment, at 371, the transaction risk monitor renders the heat map within an AR interface 123 that allows the attendant to view the video feeds with the visual features overlaid on or outlined around each individual, each item, each cart, and each bag for each group within the video feeds.

In an embodiment of 371 and at 372, the transaction risk monitor renders the AR interface 123 on the device 120, the device 120 comprises glasses worn by the attendant, an eye piece attached to a visor worn by the attendant, a tablet operated and carried by the attendant, or a phone operated and carried by the attendant.

In an embodiment, at 380, the transaction risk monitor continuously updates the scores and the heat map as changes are detected in the video feeds and the transaction data.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   mapping objects present in a physical environment to a data structure;
   tracking movements of the objects within the physical environment;
      wherein tracking further includes obtaining a live video feed for the physical environment, assigning a unique object identifier and an object type to each object based on analyzing pixels in image frames of the live video feed;
   updating relationships between the each of the objects based on the tracking;
      updating the relationships further includes associating groupings of the objects together based on locations of or calculated distances between each object relative to other objects using the unique object identifiers and the corresponding object types;
   assigning characteristics to each object based on the tracking and the updating;
      wherein assigning further includes assigning an attribute characteristic to a first object associated with a cart object type for a cart based on a total number of second objects associated with an item object type for items located within the cart exceeding a threshold number of items;
      assigning a high-value attribute characteristic to a particular second object based on a price associated with a corresponding item of the particular second object exceeding a threshold price;
   scoring each object based on the tracking, the updating, and the assigning;
   updating the data structure with scores for each of the objects based on the scoring; and
   rendering the data structure within an interface on a device operated by or worn by an attendant who is monitoring the objects within the physical environment.

2. The method of claim 1 further comprising, continuously updating the scores within the data structure in real time as the movements, the relationships, and the characteristics change.

3. The method of claim 2, wherein rendering further includes streaming the scores as each score changes within the interface in real time.

4. The method of claim 1, mapping further includes identifying the objects as transaction terminals, customers, items, carts, and bags present within the physical environment.

5. The method of claim 4, wherein tracking further includes correlating transaction details produced by the transaction terminals to the transactions of the objects associated with the customers.

6. The method of claim 1, wherein tracking further includes tracking the first object as the cart, a third object as a customer, and the second third objects as first items located in the cart and second items placed on a counter of a particular transaction terminal or placed in a bag at the particular transaction terminal after the customer scans an item code at the transaction terminal.

7. The method of claim 1, wherein scoring further includes processing rules against the corresponding movements, the corresponding relationships and the corresponding characteristics associated with each object to calculate the corresponding score.

* * * * *